Aug. 2, 1960  R. T. NOE  2,947,570
MOTOR VEHICLE BODY TELESCOPIC ROOF CONSTRUCTION
Filed March 14, 1957  5 Sheets-Sheet 1
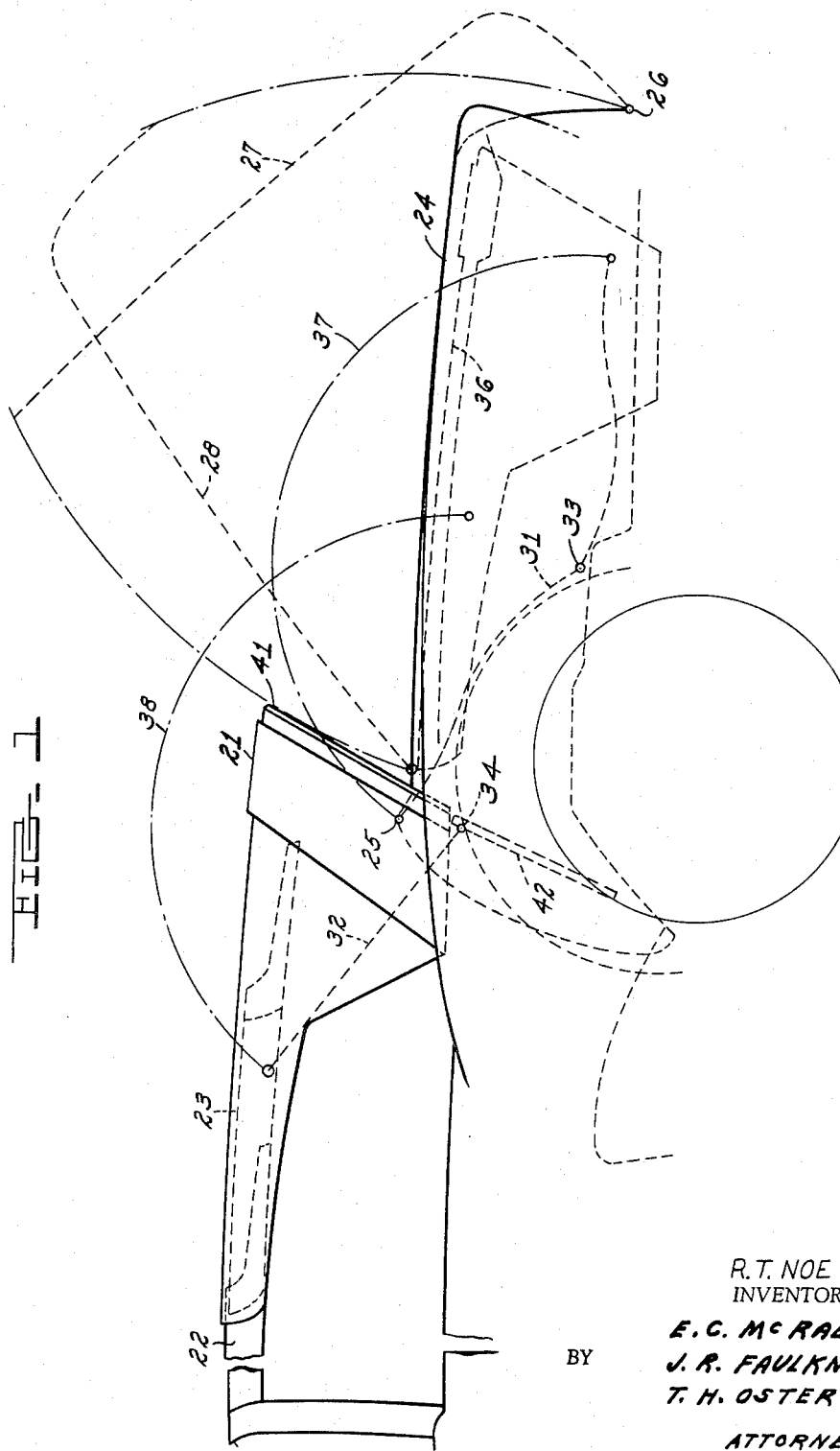
R. T. NOE
INVENTOR
BY E. C. McRAE
J. R. FAULKNER
T. H. OSTER
ATTORNEYS Aug. 2, 1960  R. T. NOE  2,947,570
MOTOR VEHICLE BODY TELESCOPIC ROOF CONSTRUCTION
Filed March 14, 1957  5 Sheets-Sheet 2
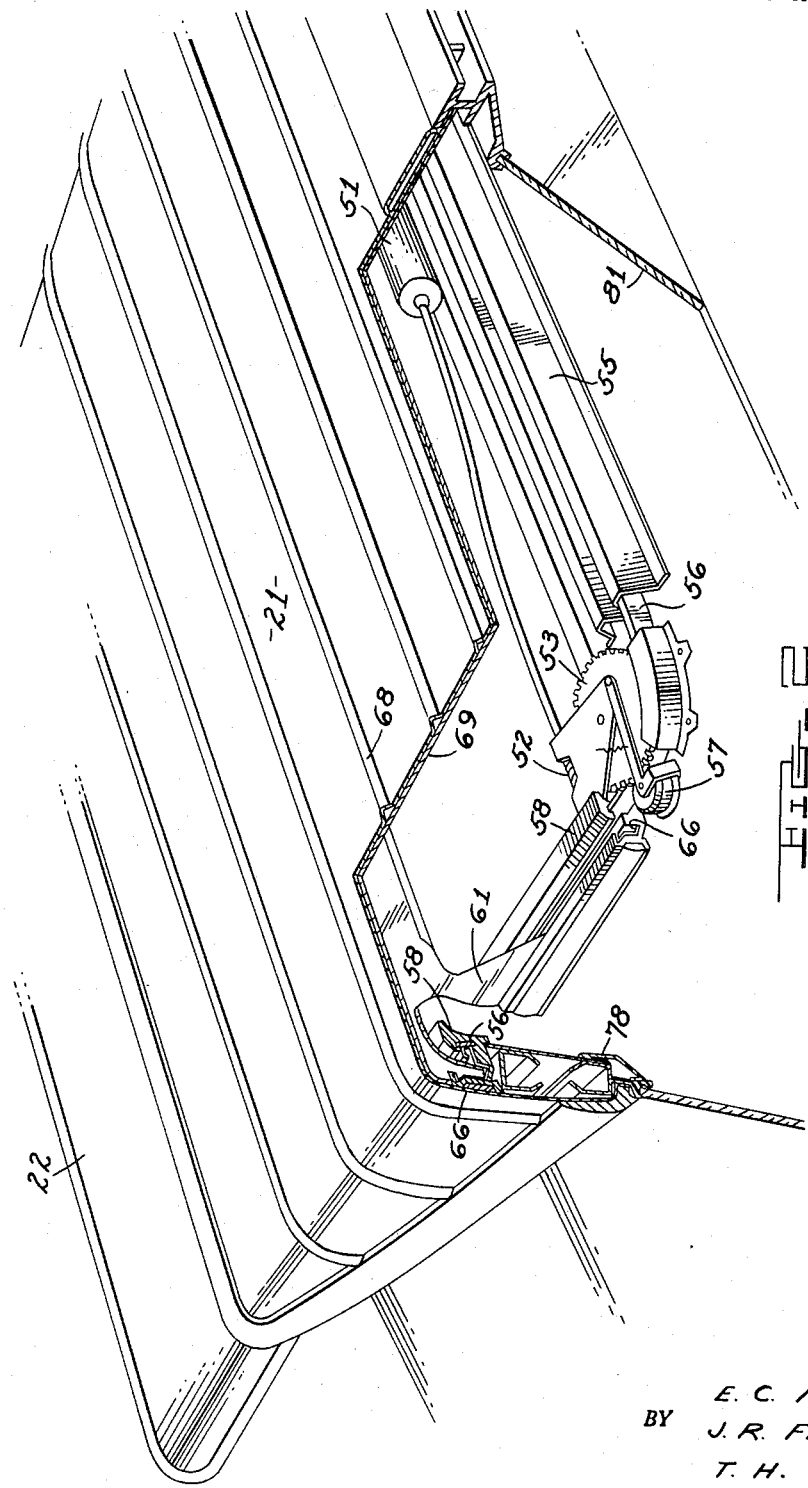
R.T. NOE
INVENTOR.
BY E. C. McRAE
J. R. FAULKNER
T. H. OSTER
ATTORNEYS

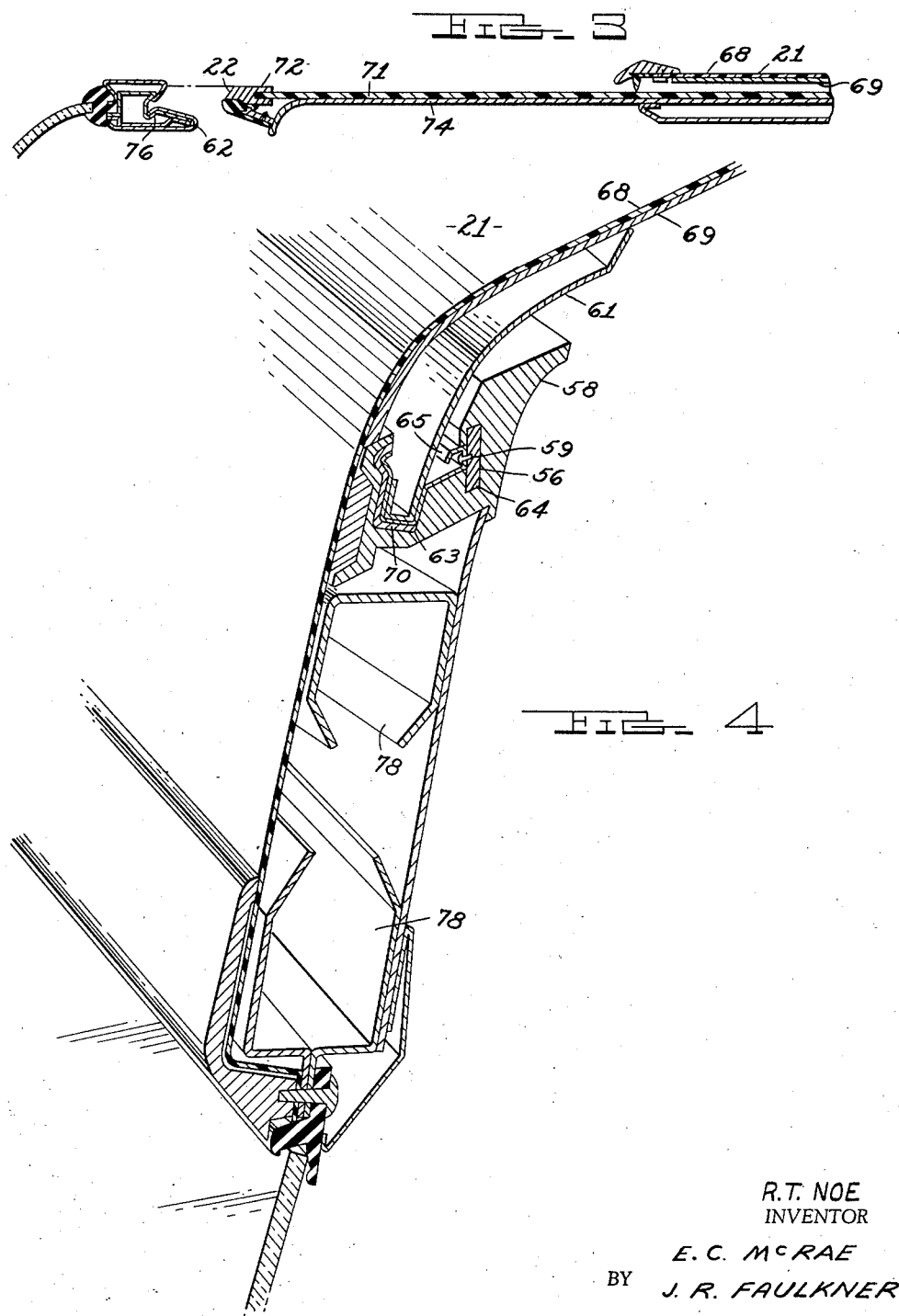

Aug. 2, 1960 R. T. NOE 2,947,570
MOTOR VEHICLE BODY TELESCOPIC ROOF CONSTRUCTION
Filed March 14, 1957 5 Sheets-Sheet 4
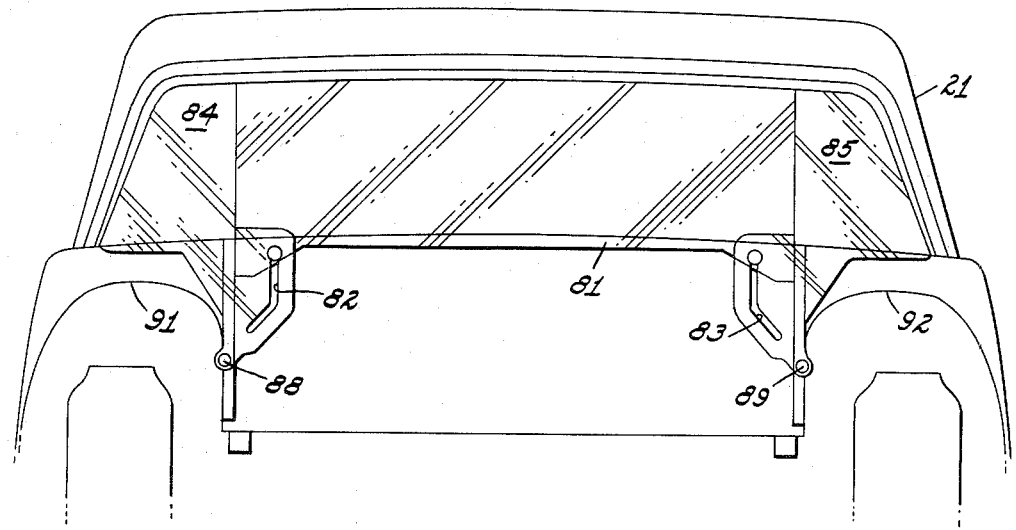
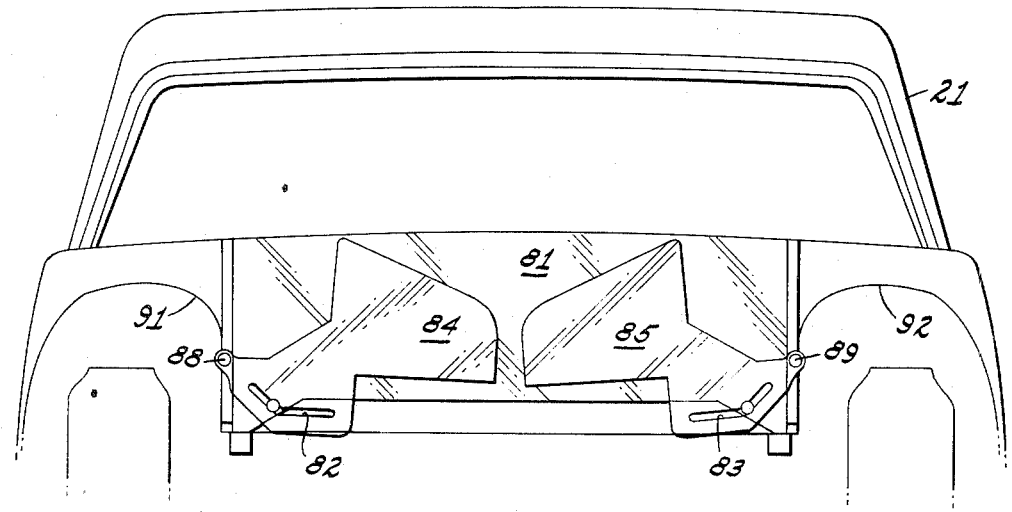
R.T. NOE
INVENTOR
BY
E. C. McRAE
J. R. FAULKNER
T. H. OSTER
ATTORNEYS Aug. 2, 1960 R. T. NOE 2,947,570
MOTOR VEHICLE BODY TELESCOPIC ROOF CONSTRUCTION
Filed March 14, 1957 5 Sheets-Sheet 5

R.T. NOE
INVENTOR.
E.C. McRAE
BY J. R. FAULKNER
T. H. OSTER

ATTORNEYS

United States Patent Office 2,947,570
Patented Aug. 2, 1960

2,947,570

MOTOR VEHICLE BODY TELESCOPIC ROOF CONSTRUCTION

Richard T. Noe, Birmingham, Mich., assignor to Ford Motor Company, Dearborn, Mich., a corporation of Delaware Filed Mar. 14, 1957, Ser. No. 646,034

4 Claims. (Cl. 296—117)

This invention pertains to a motor vehicle body construction and more particularly to a construction which provides for a sliding overhead top panel which may be manually or power operated to give the driver a brougham effect. With said top retracted into a rearwardly located roof portion, linkage and power means are provided to retract the roof portion into a compartment beneath the rear deck. The sliding top may be composed of a transparent or translucent material with a movable sun shade beneath, which may be made of anodized aluminum, for admitting or refusing overhead light as the operator desires. A connection is provided between the forward portion of the sliding top and the windshield header so that the two may be moved together in a sealing engagement and a hidden trough is provided to receive any water and conduct it to troughs along the side of the roof. Also, a backlight construction is incorporated whereby a center section is flanked by two smaller side sections and is so linked to the side sections so that after a predetermined degree of downward travel the side sections are folded inwardly and downwardly so that the entire backlight may be retracted into a width no wider than the center section. Also, since the initial downward movement of the backlight center section does not move the side sections an opening is possible for restricted or controlled ventilation and the backlight construction or appearance is not upset by partially inwardly pivoted side sections.

Package insertion and removal underneath the retracted roof is possible if a trunk door is provided at the rear end of the rear deck.

While the sliding top may be manually or power operated a device is hereinbelow shown for power operation which combines simplicity with a minimum of parts and with a precise controlled movement. By the use of a nylon, Teflon or other similar material in a ribbon which is pressed against a power driven drum and by having this ribbon attached to the sliding top it is possible to have a safety feature which, although the motor is driving the drum, will cause the top to stop and the ribbon to slip against the drum. In this way if the top becomes caught, even though the motor continues to operate, damage to moving parts and/or occupants of the vehicle will be lessened.

These and other objects and advantages will become more apparent when a preferred embodiment, which is illustrative only of the many possible embodiments of this invention, is described in the following drawings in which:

Figure 1 shows a partial elevational view showing the trunk lid in several positions and the retractable backlight in two positions with the sliding top in two positions and the path of travel of the retracting roof linkages in dotted lines;

Figure 2 is a pictorial cutaway view of a rear corner of the roof showing the motor driven drum with a sliding top attached pivot and the roof and top construction;

Figure 3 is a cross sectional view of the front header, the sliding top and the forward portion of the roof;

Figure 4 is an enlarged cutaway view of the rear corner of the roof shown in Figure 2;

Figure 5 shows the backlight linkage in the erect position;

Figure 6 shows the backlight linkage in a retract position; and

Figure 7:
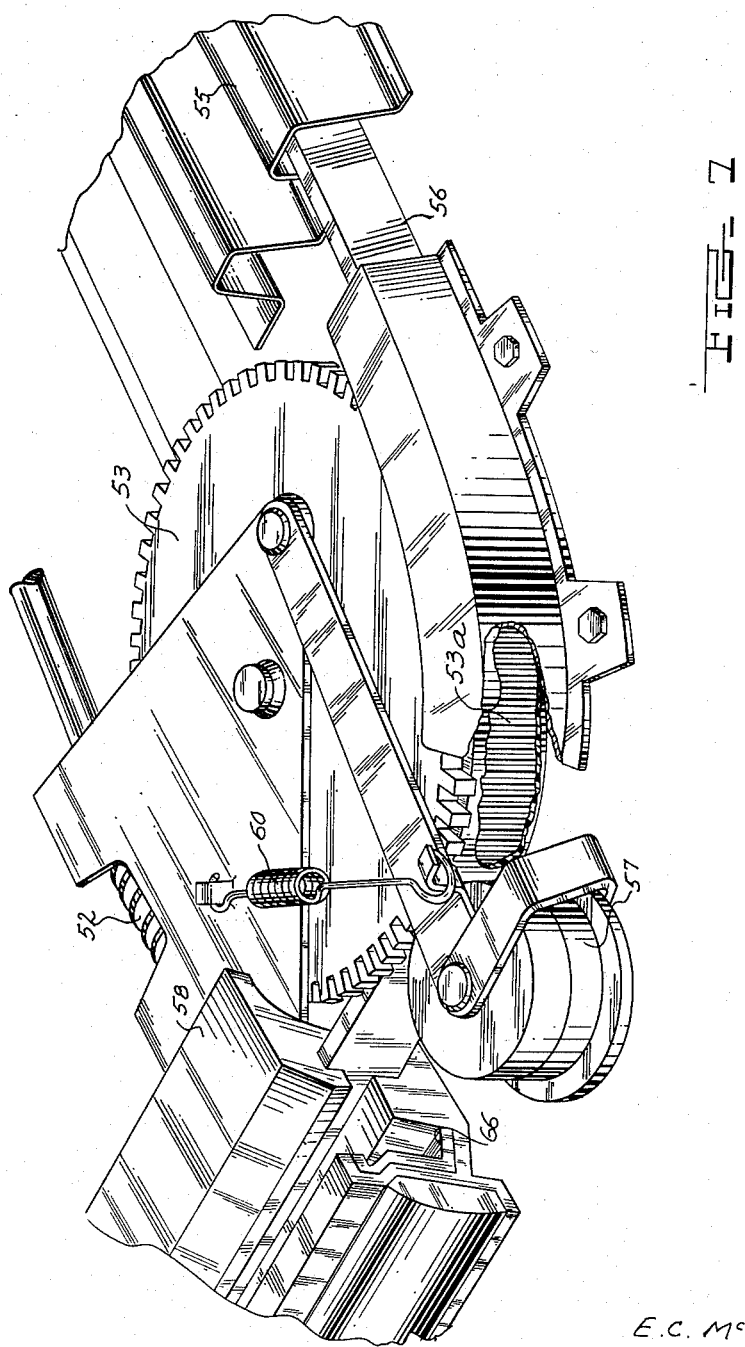
Fig. 7 is an enlarged cutaway view of the drive mechanism shown at the rear corner of Fig. 2.

The elevational view in Figure 1 shows a roof 21 which provides a housing for sliding top 22 when it is slid rearwardly with roof 21 being in an erect position. Top 22 is shown in dotted lines in the rearward position 23 and is actuated by power means such as those illustrated in Figure 2. Rear deck 24 may be pivoted either at its forward end 25 for luggage loading or at its rearward end 26 for roof retraction. When deck 24 is opened by pivoting around axis 26, it is possible, by applying power to linkage 31, to cause roof 21 with links 31 and 32 to pivot respectively about points 33, 34 in a clockwise direction depositing the roof beneath the deck as shown by the dotted outline 36 of roof 21. The travel of the forward portions of links 31 and 32 are shown respectively by arcs 37, 38. During the retracting operation top 22 is first moved to its rearwardmost position into roof 21 and therefore will not interfere with the lowering or retracting processes. When deck 24 is pivoted about axis 26 it is approximately in a position indicated by dotted line 27 and when it is pivoted about axis 25, it is in that position indicated by dotted line 28.

It is seen then that top 22 may be rearwardly slid to any desired degree into roof 21 to provide a brougham effect and the entire roof assembly including top 22 may be retracted beneath deck 24 for an open passenger compartment. In addition, backlight 41 may be opened to any degree for desirable ventilation and when retracted into the position indicated by dotted lines 42 permits a high degree of ventilation with the roof in an erect position. When the roof is in the retract position 36, the open rear portion of roof 21 permits luggage and equipment loading when deck 24 is in its raised position 28. The rearward or trunk portion of deck 24 may be pivotable upwardly so that access may be had underneath the retracted roof 36 for luggage loading and unloading without actually raising deck 24.

Roof 21 is cut away in Figure 2 to show the drive mechanism for sliding top 22 forwardly and rearwardly. Motor 51 turns a worm gear 52 which in turn rotates worm wheel 53 which is attached to a drum 53a, preferably provided with a ribbed or serrated bearing surface against which ribbon 56 is forced by spring loaded roller 57, the roller being biased by spring 60. There is such a worm gear drive on each side of the roof but just the left drive will be described and shown. Ribbon 56 may be of a nylon or Teflon or other suitable composition and rides in channel guide 58. Ribbon 56 is attached as by pin 59 to the rear portion of sliding top 22 which also rides in channel guide 58. The rear portion of top 22 is formed into a cantilever support 61 which is capable of supporting top 22 in horizontal alignment when it is in its forward travel towards header 62. Cantilever support 61 rides in groove 63 of guide 58 while ribbon 56 rides in slot 64 of guide 58. Support 61 is riveted or otherwise attached to top channel 65 which as may be seen is fixed to ribbon 56 so that movement of ribbon 56 will give movement to support 61 and channel 65 which rides along a nylon liner 70 which is self-lubricating. Formed into each side of guide 58, top 22, and support 61 is rain channel 66 which is placed and formed to collect any moisture collected between roof and top. The construction of roof 21 may be of ribbed aluminum 68 with a layer of plastic 69 which is cemented thereto for heat and sound insulation.

Looking at the top cross section in Figure 3, there is shown Plexiglas panel 71 which is fitted into top header 72 which when top 22 is in a forward position mates with windshield header 62 forming a tight connection therebetween. The engaging portions of header 62 and 72 wedge together to provide and insure a tight seal. The wedging portion of header 72 may be made of nylon or other plastic or resilient material so that a self-aligning and sealing contact is had. Rain trough 76 is provided in header 62 and receives and drains moisture which might tend to collect about the sealing connection between headers 62 and 72, thereby lessening the tendency for leakage therebetween.

Sun shade 74, which may be of anodized aluminum construction, is slidably related to panel 71 to provide light and heat insulation when desired. Sun shade 74 is shown in the fully forward position in which there is minimum heat and light reflection although, of course, it may be moved any degree rearwardly to provide a corresponding admittance to heat and light.

By using a self-lubricating ribbon which is housed in a groove in roof 21 a noiseless simplified and safe drive is realized. If the load on top 22 should be increased as by a jamming, then slippage will occur between the drum extending from the lower side of wheel 53 preventing any serious damage. At the same time, since the driving connection between wheel 53 and top 22 is of a plastic construction such as nylon or Teflon, the noise element has been greatly reduced and also lubrication between these parts becomes unnecessary. This is in combination with the fact that the drive mechanism is very compact and it has a very small vertical dimension thereby facilitating the complete removal of top 22 from room 21 without undue disturbance of the power components. Ribbon 56 is housed in trough or storage channel 55 when the top 22 is in a rearward position. Sufficient strength is designed into the roof structure through channel shaped supporting means 78 even though the metal thickness is relatively small.

Sliding top 22 may be positioned at any point between header 62 and roof 21 for the desired exposure between the driver and the outside of the vehicle. Also, while roof 22 is closed or partially closed, shade 74 may be positioned to admit the desired heat and light for or under any particular condition.

Looking now at Figures 5 and 6 is seen a three piece retractable backlight with the raised position shown in Figure 4 and the retracted position shown in Figure 5. The center portion 81 rides in two angled slots 82, 83 in side sections 84, 85, which are pivoted respectively at 88, 89. It is seen then that as center section 81 is moved downwardly under manual or power activation side sections 84, 85 are not moved until the bend of slots 82, 83 are contacted. This provides a variable opening of section 81 without moving side sections 84, 85 inwardly in an unattractive and undesirable manner. However, once section 81 reaches the bend of slots 82, 83 then side sections 84, 85 pivot inwardly and downwardly until the position shown in Figure 5 is reached. Here the backlight is completely retracted in a space no wider than the center section 81 which is positioned between wheel housings 91, 92. Therefore, instead of having just a portion of the backlight retracted due to the limited underneath space, a mechanism is provided wherein the entire window area is removed for more complete ventilation and attractive appearance.

It is to be understood that the invention is not to be limited to the exact construction shown and described, but that various changes and modifications may be made without departing from the spirit and scope of the invention, as defined in the appended claims.

What is claimed is:

1. In a motor vehicle roof assembly, a base roof portion having internal longitudinally extending channel members at each side thereof, each of said channel members having at least a pair of longitudinally extending parallel guide elements, a movable panel section slidably guided by at least one of said guide elements in each channel member for internal longitudinal retraction within said base roof portion, a strip member guided within another of said guide elements, said strip member being attached to said movable panel section, and power means for moving said strip member and thereby said movable panel section relative to said base roof portion into protracted or retracted positions relative to said base roof portion.

2. In a motor vehicle roof assembly, a base roof portion having internal longitudinally extending channel members at each side thereof, each of said channel members having at least a pair of longitudinally extending parallel guide elements, a movable panel section slidably guided by at least one of said guide elements in each channel member for internal longitudinal retraction within said base roof portion, a strip member guided within another of said guide elements, said strip member being attached to said movable panel section, and motor driven means mounted on said base roof portion and frictionally engaged with said strip member for moving the latter and thereby said movable panel section relative to said base portion into protracted or retracted position relative to said base roof portion.

3. In a motor vehicle roof assembly, a base roof portion having internal longitudinally extending channel members at each side thereof, each of said channel members having at least a pair of longitudinally extended parallel guide elements, a movable panel section slidably guided by at least one of said guide elements in each channel member for internal longitudinal retraction within said base roof portions, a strip member guided within another of said guide elements, said strip member being attached to said movable panel section, motor driven means mounted on said base roof portion and frictionally engaged with said strip member for moving the latter and thereby said movable panel section relative to said base portion into protracted or retracted position relative to said base roof portion, and a biased roller engaging said strip member resiliently urging the latter into engagement with said motor driven means.

4. A motor vehicle roof assembly comprising a base roof portion, a movable panel top section movable relative to said base roof portion, a strip member connected to said movable top panel, motor driven means mounted on said base roof portion and frictionally engaging said strip member whereupon actuation of said means will move said strip member and position said top panel section relative to said base roof portion, said motor driven means comprising a motor mounted on said roof base portion, a friction member mounted on said roof base portion adjacent said strip member, means connecting said friction member to said motor, and a spring loaded roller engaging said strip member resiliently urging said strip member against said friction member.

References Cited in the file of this patent

UNITED STATES PATENTS

| | | |
|---|---|---|
| 2,623,779 | Catell | Dec. 30, 1952 |
| 2,632,670 | Crenshaw | Mar. 24, 1953 |
| 2,714,035 | Limberg et al. | July 26, 1955 |
| 2,733,954 | Blake | Feb. 7, 1956 |
| 2,747,921 | Hooverson et al. | May 29, 1956 |
| 2,747,923 | McLean | May 29, 1956 |
| 2,768,024 | Spear | Oct. 23, 1956 |
| 2,782,070 | Chaban | Feb. 19, 1957 |
| 2,785,922 | Chika | Mar. 19, 1957 |
| 2,798,763 | Dujic | July 9, 1957 |
| 2,841,441 | Evans | July 1, 1958 |